(12) United States Patent
Madan

(10) Patent No.: US 8,433,559 B2
(45) Date of Patent: Apr. 30, 2013

(54) TEXT ANALYSIS USING PHRASE DEFINITIONS AND CONTAINERS

(75) Inventor: Umesh Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 12/410,456

(22) Filed: Mar. 24, 2009

(65) Prior Publication Data

US 2010/0250235 A1    Sep. 30, 2010

(51) Int. Cl.
*G06F 17/27* (2006.01)
*G06F 17/28* (2006.01)
*G06F 17/30* (2006.01)
*G06F 12/14* (2006.01)

(52) U.S. Cl.
USPC ........ 704/9; 704/3; 704/4; 707/758; 707/769; 707/780; 715/230; 713/189

(58) Field of Classification Search .......... 707/1; 704/3, 704/4, 9
See application file for complete search history.

(56) References Cited

U.S. PATENT DOCUMENTS

| | | | |
|---|---|---|---|
| 5,680,628 A | | 10/1997 | Carus et al. |
| 5,696,962 A * | | 12/1997 | Kupiec .................... 1/1 |
| 6,665,640 B1 | | 12/2003 | Bennett et al. |
| 6,665,666 B1 * | | 12/2003 | Brown et al. ............ 1/1 |
| 6,697,793 B2 * | | 2/2004 | McGreevy ............ 1/1 |
| 6,839,665 B1 | | 1/2005 | Meyers |
| 7,206,778 B2 * | | 4/2007 | Bode et al. ............ 1/1 |
| 7,263,517 B2 * | | 8/2007 | Sheu et al. ............ 1/1 |
| 7,302,383 B2 * | | 11/2007 | Valles .................. 704/9 |
| 7,376,551 B2 * | | 5/2008 | Powell et al. ............ 704/4 |
| 7,689,555 B2 * | | 3/2010 | Dettinger et al. ...... 707/999.005 |
| 7,809,551 B2 * | | 10/2010 | Sandor et al. ............ 704/9 |
| 7,953,755 B2 * | | 5/2011 | Keith et al. ............ 707/790 |
| 8,280,903 B2 * | | 10/2012 | Broder et al. ............ 707/769 |
| 2002/0147578 A1 | | 10/2002 | O'Neil et al. |
| 2004/0064438 A1 * | | 4/2004 | Kostoff ................ 707/1 |
| 2005/0108630 A1 * | | 5/2005 | Wasson et al. ............ 715/513 |
| 2006/0129843 A1 * | | 6/2006 | Srinivasa et al. ............ 713/189 |
| 2006/0184523 A1 * | | 8/2006 | Israel et al. ............ 707/6 |
| 2006/0212421 A1 | | 9/2006 | Oyarce |
| 2007/0174041 A1 * | | 7/2007 | Yeske ................ 704/3 |
| 2007/0198480 A1 | | 8/2007 | Hogue et al. |
| 2008/0301135 A1 * | | 12/2008 | Alves et al. ............ 707/6 |
| 2010/0153412 A1 * | | 6/2010 | Mavrov et al. ............ 707/758 |
| 2012/0030241 A1 * | | 2/2012 | Lupoli et al. ............ 707/780 |

OTHER PUBLICATIONS

Blanchon, Herve., "A Pattern-based Analyzer for French in the Context of Spoken Language Translation: First Prototype and Evaluation", Proceedings of the 19th international conference on Computational Linguistics, vol. 1, Aug. 24-Sep. 1, 2002, retrieved at <<http://portal.acm.org/citation.cfm?id=1072398>>, pp. 1-7.

(Continued)

*Primary Examiner* — Paras D Shah
*Assistant Examiner* — Neeraj Sharma

(57) ABSTRACT

In one example, a phrase analyzer may analyze a text input stream to identify phrases contained in the text input stream. The phrase analyzer may receive a specification, which includes dictionaries of phrases and synonyms, and a specification of the phrases, or sequences of phrases to be matched. The phrase analyzer may compare the input stream to the specification and may produce, as output, an identification of which phrases appear in the input stream, and where in the input stream those phrases occur.

20 Claims, 6 Drawing Sheets

OTHER PUBLICATIONS

Brock, Mark N., "Customizing a Computerized Text Analyzer for ESL Writers", CALICO Journal, vol. 8, No. 2, Dec. 1990, retrieved at <<https://www.calico.org/a-495-Customizing%20A%20Computerized%20Text%20Analyzer%20For%20ESL%20Writers.html>>, 5 pages.

Cho, et al., "Automatic Section Segmentation of Medical Reports", AMIA Annual Symposium Proceedings, dated: 2003, retrieved at <<http://www.pubmedcentral.nih.gov/articlerender.fcgi?artid=1479978>>, pp. 7.

Llobera, et al., "Football Information Extraction System", Projektarbeten 2003, Lund Universitet, dated: 2004, retrieved at <<http://www.cs.lth.se/EDA171/Reports/2003/projects2003.pdf>>, pp. 21-26.

Delgado, et al., "Mining Text Data: Special Features and Patterns", Pattern Detection and Discovery (D.J. Hand et al., eds.), dated: 2002, pp. 140-153, Springer-Verlag Berlin Heidelberg.

\* cited by examiner

TEXT ANALYSIS USING PHRASE DEFINITIONS AND CONTAINERS

BACKGROUND

Applications such as text analysis, data mining, and query processing involve detecting features of a given piece of text. Features may take the form of words, sequences of words, specific parts of speech, etc. For example, "heart attack" might be a textual feature that is associated with a specific medical condition. That feature might have variations, such as different names for the same condition (e.g., "heart failure," "cardiac arrest," etc.), or misspellings (e.g., "heart attack," "heart attack," etc.), which are to be treated in the same way when analyzing the text.

Various models are used for text processing. For example, regular expressions may be used to match input against certain types of patterns. Or, input text can be matched against a dictionary of specific words and/or phrases. Tries, prefix trees, and suffix trees are other structures that may be used to analyze and recognize input text. Text analyzers are normally written using an ad hoc combination of these (or other) approaches. Such text analyzers are normally written from scratch, with a specific text recognition task in mind.

Certain types of text analyzer systems have been created to deal with specific situations. The Lex and Flex systems are lexical analyzer generators; they generate programs that take character streams as input and generate token streams as output, by recognizing user-specified regular expressions in the character stream. The Yacc and Bison systems are parser generators; they generate programs that take token streams as input, and that perform user-specified actions, such as building parse trees, based on recognition of certain grammatical structures in the token stream. These systems all focus on processing input that meets a narrow formal language specification. Lex and Flex generate lexical analyzers whose text analysis abilities are mainly limited to recognizing input in the regular language class (i.e., those language that can be described by regular expressions). Yacc and Bison generate parsers whose analysis abilities are largely limited to recognizing input in a very narrowly defined subset of the context-free language class. Since unstructured text (e.g., web pages, journal articles, books, etc.) is written in natural language, these systems may be unsuited to analysis of unstructured text. In theory, it may be possible to use regular expressions to define the rules for analysis of unstructured text. However, doing so may be prohibitively difficult.

SUMMARY

A phrase analyzer may be used to recognize and to classify words and phrases that appear in a document. The phrase analyzer receives a specification of items to be recognized, and generates output that indicates where, in an input document, the items occur.

A specification of items to be recognized may be provided to the phrase analyzer. The specification may include a code section and a data section. The code section defines the particular collection of phrases that are to be identified in an input document. The code section may use various types of containers. For example, the code section may use an "and" container (indicating that positive identification only occurs if all of the phrases in the "and" container are identified in an input context), or an "or" container (indicating that positive identification occurs if any one of the phrases in the "or" container is found in an input context). Other types of containers may also be used. The data section defines dictionaries of phrases to be identified. The data section may also contain lists of synonyms that are to be recognized when identifying the phrases.

The phrase analyzer receives the specification of phrases to be recognized, and then uses that specification to analyze an input. The input may be any sort of material, such as a web page, a journal article, a query, etc. In general, the phrase analyzer may be used to recognize phrases in any type of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various applications involve analysis of text. For example, executing a search query typically begins with analysis of the query to identify relevant words and phrases in the query, to identify and correct misspellings, etc. As another example, the back end of a search engine indexes documents, where the indexing process involves identifying and classifying words and phrases that occur in the document. Yet another example of a text analysis application is feature extraction, which is a process that attempts to extract facts from a text document by putting labels on objects (e.g., "Joe is a lawyer", "the Mariners are a baseball team", etc.). These applications, and others, use phrase analysis to identify and classify relevant phrases in some input text.

The subject matter described herein provides mechanisms that may be used to perform phrase analysis. A phrase analyzer receives two inputs: a specification of the phrases to be identified, and an input text to be analyzed. The phrase analyzer uses the specification to determine which phrases to identify in the input text.

The specification provides a flexible way to describe various different types of phrases to be identified and classified. In one example, the specification has a data section and a code section. The data section contains a dictionary of phrases, and synonyms that may be used in recognizing the phrases. The code section contains a set of containers that describe the specific combinations of phrases to be recognized. The combinations may be specified in various types of containers, such as "and", "or", "list", and "all". For example, when phrases appear together in an "and" container, a match is found if all of the phrases in the "and" appear in a sequence of input words. In an "or" container, a match is found if any one of the phrases in the "or" container appear together in a sequence of input words. Other types of containers are further described below.

The phrase analyzer also may invoke a custom matcher, which may perform various types of actions on the input, such as lemmatization, spell checking and/or spelling correction, custom feature detection logic, or any other type of text analysis task.

Figure 1:
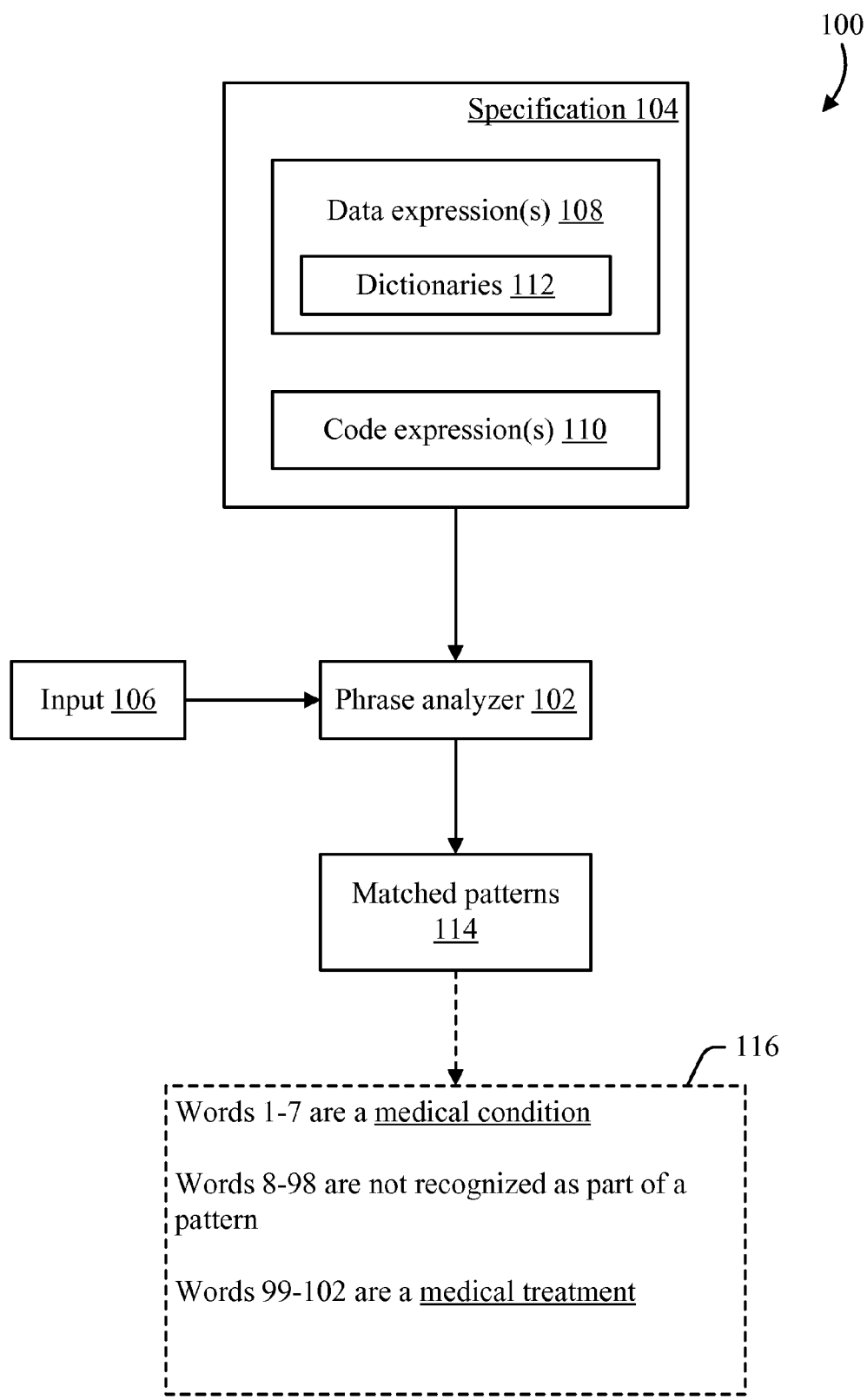
FIG. 1 is a block diagram of an example system in which an input text may be analyzed to identify phrases.

Turning now to the drawings, FIG. 1 shows an example system 100 in which an input text may be analyzed to identify and classify phrases. Phrase analyzer 102 receives a specification 104 of phrases to be identified, and then analyzes input 106 to determine which, if any, of the phrases specified by specification 104 appear in input 106. Input 106 may be any type of input that contains at least some text. For example, input 106 may be a web page, a journal article, a query, etc. In the description herein, input 106 is typically described as an "input stream." While the term "stream" sometimes refers to data that is being created and/or provided dynamically (through a network interface, through an inter-process pipe, etc.), the term "input stream," as used herein, is not limited in this way. An input stream may be any sequence of words that appear in some order. The stream may be provided in any manner—e.g., through a file, through a dynamically-provided sequence of words arriving through a network interface, through an inter-process pipe, or through any other mechanism through which text could be provided to an analyzer. The analyzer itself may implement a word breaker in order to convert an arbitrary character stream into a word stream—e.g., the analyzer could be configured to break words at typical separator characters (e.g., space, tab, newline, or any arbitrary character), thereby generating a word stream from a character stream.

Specification 104 may contain one or more data expressions 108 and one or more code expressions 110. Data expressions 108 may include dictionaries 112 which specify phrases, and may also specify which words and/or phrases are to be treated as synonyms of each other. Examples of how dictionaries are specified, and how various kinds of synonyms are used are described below.

Code expressions 110 specify pattern matching rules, as a function of the phrases defined in data expressions 108. For example, in a health search application, a pattern matching rule might specify that a pattern to be found is the name of a disease combined with the name of a drug. In order to specify that such a pattern is to be searched for, data expressions 108 may contain a list of phrases that are disease names and another list of phrases that are drug names. Then code expressions 110 may include a container specifying that a pattern to be found is a sequence of words that include a term from the list of disease names and a term from the list of drug names.

When phrase analyzer 102 analyzes input 106, it generates a list of matched patterns 114. Matched patterns 114 indicate which of the patterns described in specification 104 have been found in input 106, and may also indicate where in input 106 those patterns have been found. Matched patterns 114 may be described in any format. In one example, matched patterns 114 are provided in the form of a text file 116. Text file 116 may identify the ordinal positions of specific words in input 106 that have matched certain types of patterns. For example, text file 116 says that, in input 106, words 1-7 have matched the name of a "medical condition", words 8-98 have not matched any pattern, and words 99-102 have matched the name of a "medical treatment." (In this example, "medical condition" and "medical treatment" are examples of labels that describe the match.) While text file 116 is one example way to represent matched patterns 114, any format could be used to represent matched patterns 114.

Figure 2:
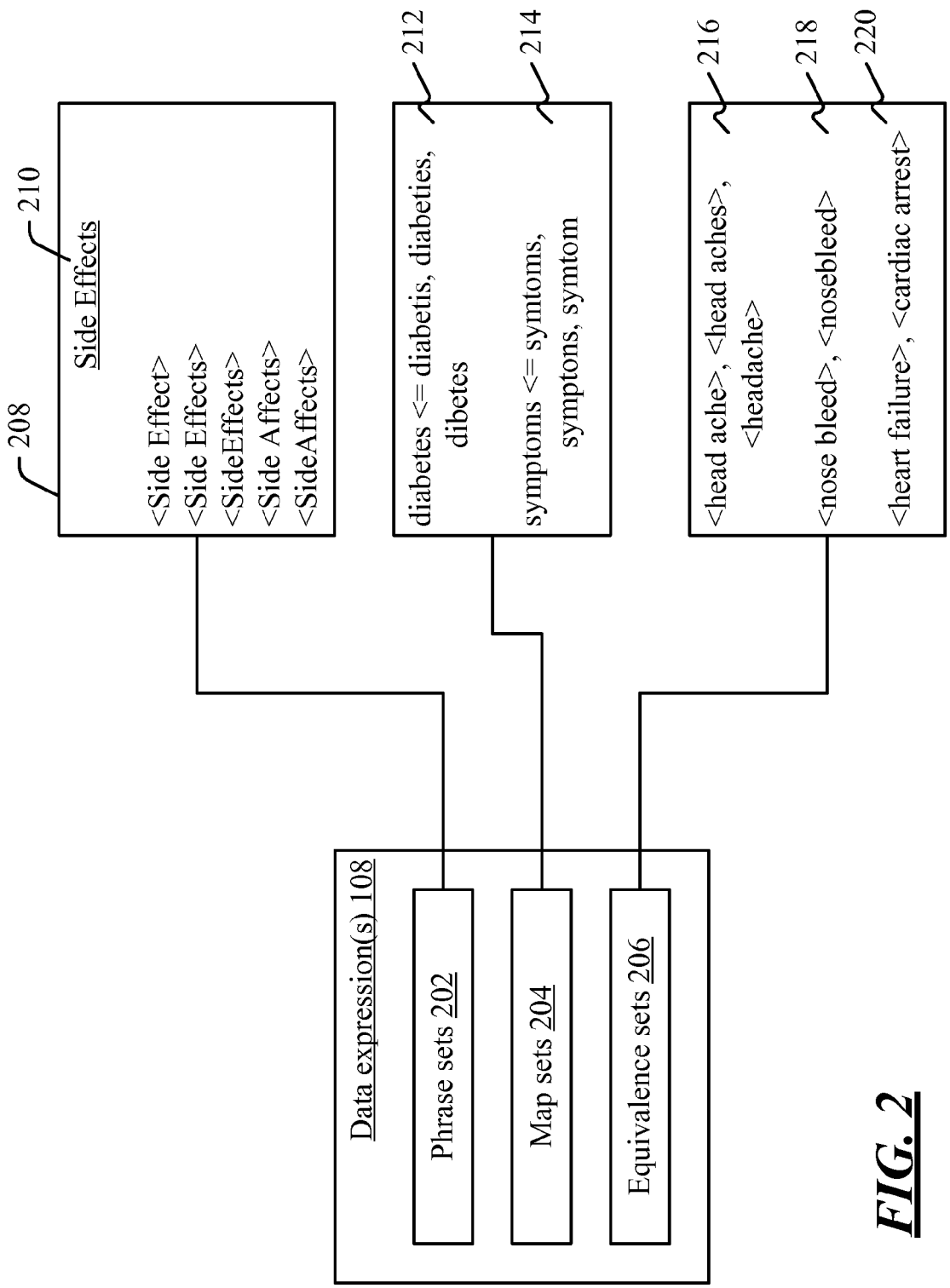
FIG. 2 is a block diagram of example data expressions.

FIG. 2 shows examples of data expressions 108. Data expressions 108 may include one or more phrase sets 202, one or more map sets 204, and one or more equivalence sets 206.

Each of phrase sets 202 define sets of phrases that have related meanings. For example, phrase sets 202 may include a specific set 208 of phrases that describe various different ways of writing "side effects." Thus, the various different ways of writing "side effects" are "Side Effect", "Side Effects", "Side Effects", "Side Affects", "Side Affects", etc., where each of the quoted items (or each of the items shown in angle brackets in set 208 in FIG. 2) is a phrase. The phrases that make up a phrase set may be words having similar meanings as shown, but may also be words that are related in other ways. For example, a given one of phrase sets 202 could be a list of drug names, a list of disease names, etc., a list of words that are typically ignored in a query (e.g., "is", "an", "the"), or any set of words that are related to each other in any way. Each one of phrase sets may have a name. For example, the name 210 of set 208 is "Side Effects", indicating that the different members of set 208 are different ways of writing "side effects." The name may be used in code expressions 110 (described below), in order to refer to a specific phrase set.

Map sets 204 define conversions of one or more words into another word. Map sets 204 may be used to describe, for example, misspellings of a word (although map sets could be used in ways other than to define misspellings). In the example of FIG. 2, map sets 204 include two example sets 212 and 214. Set 212 defines possible misspellings of the word "diabetes", and set 214 defines possible misspellings of the word "symptom." (The "<=" sign indicates that the word(s) to the right of the "<=" are to be converted into the word to the left of the "<=".) Thus, when a phrase analyzer (e.g., phrase analyzer 102, shown in FIG. 1) encounters a word such as "diabetis", using the information contained in set 212 the phrase analyzer treats that word as if the word "diabetes" had been encountered. Similarly, if "symptoms" is encountered, then, based on the information contained in set 214, the phrase analyzer treats that word as if "symptoms" had been encountered.

Equivalence sets 206 define words that are equivalent to each other, and thus are to be treated as if any of the equivalent words had been encountered. For example, documents on the ailment cephalalgia may refer to that disease using the term "head ache", "head aches", or "headaches". Thus, equivalence sets 206 includes a set 216 that indicates that those various ways of writing "head ache" are equivalent to each other. As a result, when a phrase analyzer encounters any of these terms, it may treat the input document as if it had encountered all of the terms in set 216. Similarly, sets 218 and 220 define different ways of writing "nose bleed" and "heart attack," respectively.

Data expressions 108 could be specified inline, or could be referenced in a file. Thus, there could be a file that contains all of the phrase sets, map sets, and/or equivalence sets that are to be used for a given text analysis job. Or, that file could point to other files where the phrase sets, map sets and/or equivalence sets are contained. Or the file could specify some sets inline, while also pointing to other files where other sets are stored.

Figure 3:
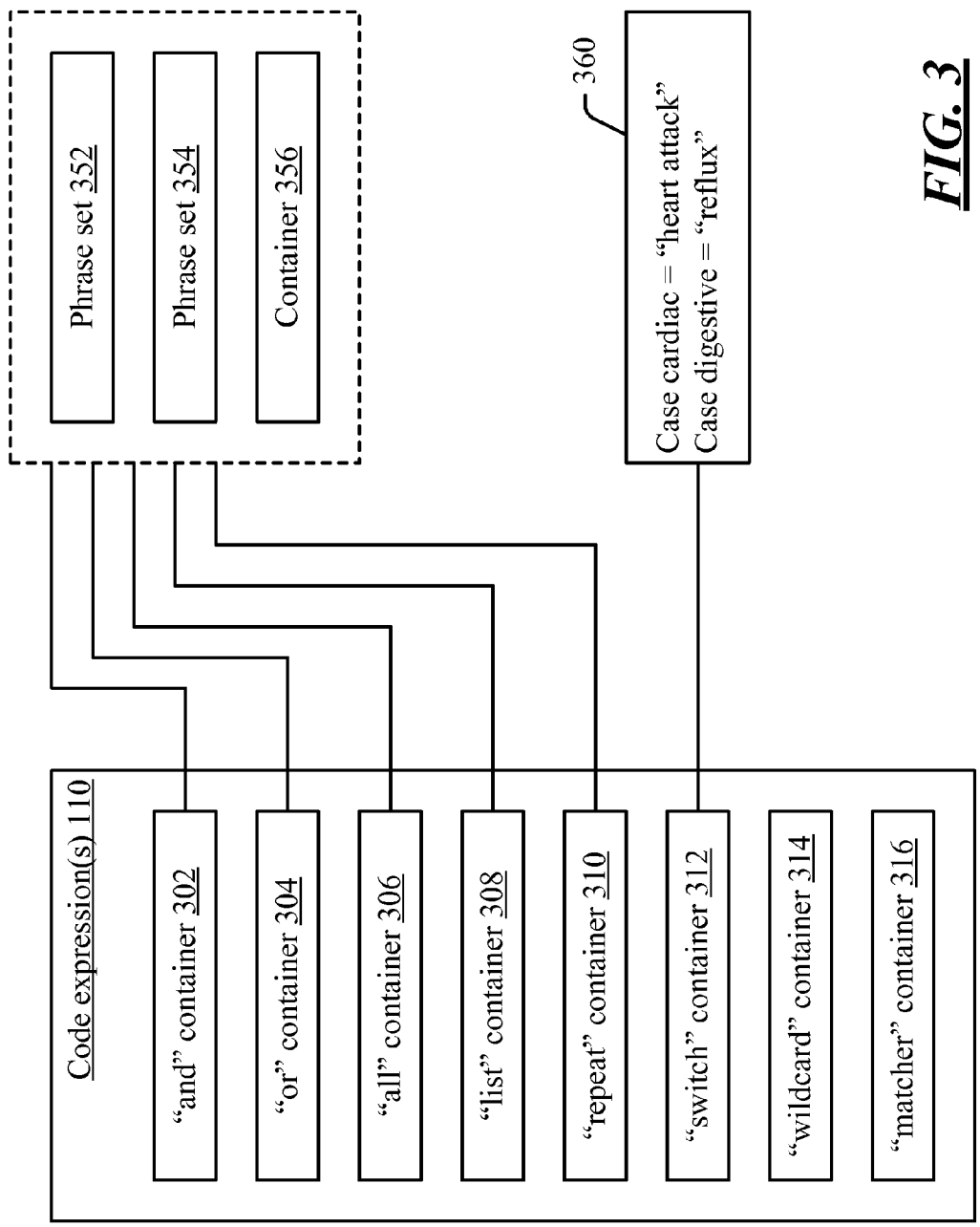
FIG. 3 is a block diagram of example code expressions.

FIG. 3 shows examples of code expressions 110. Code expressions 110 may include various types of containers. Examples of containers include "and" container 302, "or" container 304, "all" container 306, "list" container 308, "repeat" container 310, "switch" container 312, "wildcard" container 314, and "matcher" container 316. Containers are used to describe patterns to be matched. Some containers (e.g., "and", "or", "all", "list", and "repeat") represent various ways in which phrases sets may be combined as part of a pattern to be matched. Other containers may represent other types of patterns. Switch container contains "case" constructs that represent alternative sequences of words to be matched. Containers may be nested: e.g., an "and" container may contain "or" containers, "wildcard" containers, other "and" containers, etc.

Code expressions 110 include a set of containers and statements that describe the patterns to be matched. For example, suppose that one pattern contains a disease name and a drug name. Further suppose that phrase sets named "DiseaseName" and "DrugName" have been defined in data expressions 108. Then, in order to recognize this pattern, code expressions 110 could include an "and" container that includes the DiseaseName phrase set and the DrugName phrase set. An input sequence of words matches this container if it contains one phrase from the "DiseaseName" phrase set and another phase from the "DrugName" phrase set. The use of an "and" container means that, in order to match the container, the input stream has to have a sequence of words that contain phrases from both sets. If an "or" container had been used, then the input stream would match if a sequence of words contains a phrase from either the "DiseaseName" phrase set or the "DrugName" phrase set.

The following is a description of each of the types of containers.

"And" container 302 is a container for one or more phrases, other containers, or combinations thereof. In order for the input stream to match an "and" container, the current context in the input stream has to have all of the elements in the "and" container (where an element is either a phrase set or another container).

"Or" container 304 is a container for one or more phrases, other containers, or combinations thereof. The elements in the "or" container can be matched in the alternative. That is, the "or" container is matched if the current context of the input stream contains at least one of the items in the container.

When elements are combined in an "all" container 306, the input stream matches the container if (a) the input stream contains all of the elements in the container, and (b) there are no more words in the current context left to consume after all of the elements in the container have been found. In this sense, the "all" container is like an "and" container 302, except that the "all" container insists that the current context in the input stream contain only the items in the container, and nothing more. Use of the "all" container might make sense in evaluating a query. For example, if one were analyzing a journal article or web page, it would be difficult to impose a condition that the article contain exactly a specific set of phrases, since articles are of widely varying length and tend to move from one topic to another. However, in evaluating a query there might be reason to differentiate between, say, (a) those queries that contain a drug name and a disease name, along with other words, and (b) those queries that contain a drug name and a disease name with no other words. The latter case, which could be described with an "all" container, indicates a query that is particularly focused on drugs and diseases, while the former case might indicate a query of a diffuse nature.

When elements are combined in "list" container 308, the input stream matches the container if the current context of the input stream contains at least one of the elements in the container. In this sense, "list" container 308 is similar to "or" container 304. However, when "or" container is used, the phrase analyzer may stop attempting to match the input stream against the container as soon as one of the elements in the input stream is found. Thus, if an "or" container includes the phrase sets A, B, and C, and an instance of phrase set A is found, the phrase analyzer may stop determining whether the current context also contains a B or a C, and may simply declare, in its output, that an A phrase was found at the position of the current context. By contrast, if A, B, and C are included in a list container, then even if the phrase analyzer finds an A in the current context, it will re-evaluate the context to determine whether a B and/or a C are also present, and will provide output indicating which of A, B, and C are present in the context being examined, rather than merely stopping with the first element detected.

When "repeat" container 310 is used, the input stream matches the container if any of the elements in the container are found. However, repeat container may evaluate the input stream for elements in the repeat container at various offsets, rather than consuming the words that have been found as part of a previous element. For example, if a "repeat" container contains a phrase set that includes the phrase "heart attack" and the phrase analyzer finds this phrase at words 4-5 of the input stream, then after the phrase analyzer reports that it has found the "heart attack" phrase beginning at word four, the phrase analyzer then moves to word five and attempts to find a new instance of the phrase set that starts at word five. In the absence of a "repeat" container, the phrase analyzer would have consumed words 4-5 since they were used in matching the phrase set, and would then start looking for the next match at word six.

A "switch" container 312 is similar to a switch statement in a typical programming language, in that it allows pattern recognition to branch on one or more cases. A switch container contains one or more cases, representing different types of patterns that could be detected. For example, a switch container might contain cases such as "case cardiac='heart attack'", "case digestive='reflux'", etc. (as shown in box 360). Thus, the switch container matches the input if the input contains either the phrase "heart attack" or "reflux", and labels the current context either "cardiac" or "digestive" depending on which phrase was found. A case can have any other container as a child.

A "wildcard" container 314 matches an arbitrary input, and may be used to consume sequences of words in the input that do not match any specific phrase. For example, if an "and" container contains the elements:

Phrase set: DiseaseName
Wildcard container
Phrase set: DrugName then the input stream matches the "and" container if the input contains a disease name (the first phrase set element), followed by any sequence of zero or more words (the wildcard container element), followed by a drug name (the second phrase set element). Without the wildcard element, the match would fail unless the disease name and drug name appeared adjacent to each other in the input stream.

"Matcher" container 316 is a container that corresponds to an arbitrary analysis routine. While containers 302-314 cause phrase analyzer to compare the input stream to phrases using the phrase analyzer's own analysis logic, "matcher" container 316 invokes an arbitrary program on the input stream. Thus, "matcher" container 316 might be used if the techniques implemented by the phrase analyzer are inadequate to perform some specialized or custom analysis task. In this sense, "matcher" container 316 may be used to invoke an arbitrary program to analyze input in any manner.

In addition to the above examples of containers, other containers could be implemented. There may be a "container" interface, and a new type of container could be created by writing a module that implements the interface. The analyzer can then invoke the module through the interface, and can also use the interface to pass the current context to the module. Each type of container could be assigned an XML tag, so that the analyzer can recognize the new type of container in a code section and will know which module to invoke when that tag is encountered.

Some examples of containers that could be implemented are:
  Conditional operators that can look at the current context for matches were already found.
  Operators that implement 'near' or 'distance' operations for rules. E.g., containers could be implemented that allow operations such as "If Found("Drug") and (Position("Drug")-Context.CurrentPosition)<5, then . . . ", or "if (Drug near "INDICATOR") then . . . ."

As noted above, certain types of containers may contain phrase sets or other containers. Thus, for example, any of containers 302-310 may contain phrase set 352, phrase set 354, and container 356. The manner in which phrase sets 352 and 354, and container 356, are combined within a given container depends on the container. For example, if these elements are combined in an "and" container, then the phrase analyzer will find that the input matches the container if a given context in the input contains (a) an instance of phrase set 352, (b) an instance of phrase set 354, and (c) an instance of whatever pattern is described by container 356. On the other hand, if phrase sets 352 and 354, and container 356, are combined in an "or" container, then the input matches the container if a given context in the input has either (a) an instance of phrase set 352, or (b) an instance of phrase set 354, or (c) an instance of whatever pattern is described by container 356. And so on. As a specific example, a set of nested containers might be described as:

```
<and>
  <phraseSet>DrugName</phraseSet>
  <phraseSet>DiseaseName</phraseSet>
  <or>
    <phraseSet>PharmaceuticalCompanyName</phraseSet>
    <phraseSet>HospitalName</phraseSet>
  </or>
</and>
```

(This example is written in an XML-like format, although containers could be described in any format.) The foregoing example defines an "and" container that includes two phrase sets (drug name and disease name), and an "or" container that includes two more phrase sets (the name of a pharmaceutical company and the name of a hospital). Thus, the "or" container is matched if a context in the input stream contains the name of a pharmaceutical or the name of a hospital. The "and" container is matched if a context in the input stream contains a drug name, a disease name, and an instance of the "or" container. So, in this example, the "and" container is matched if a context in the input stream contains a drug name, a disease name, and a pharmaceutical company name, or if that context contains a drug name, a disease name, and a hospital name. The foregoing is one example of nesting containers, although any type of containers may be nested.

Figure 4:
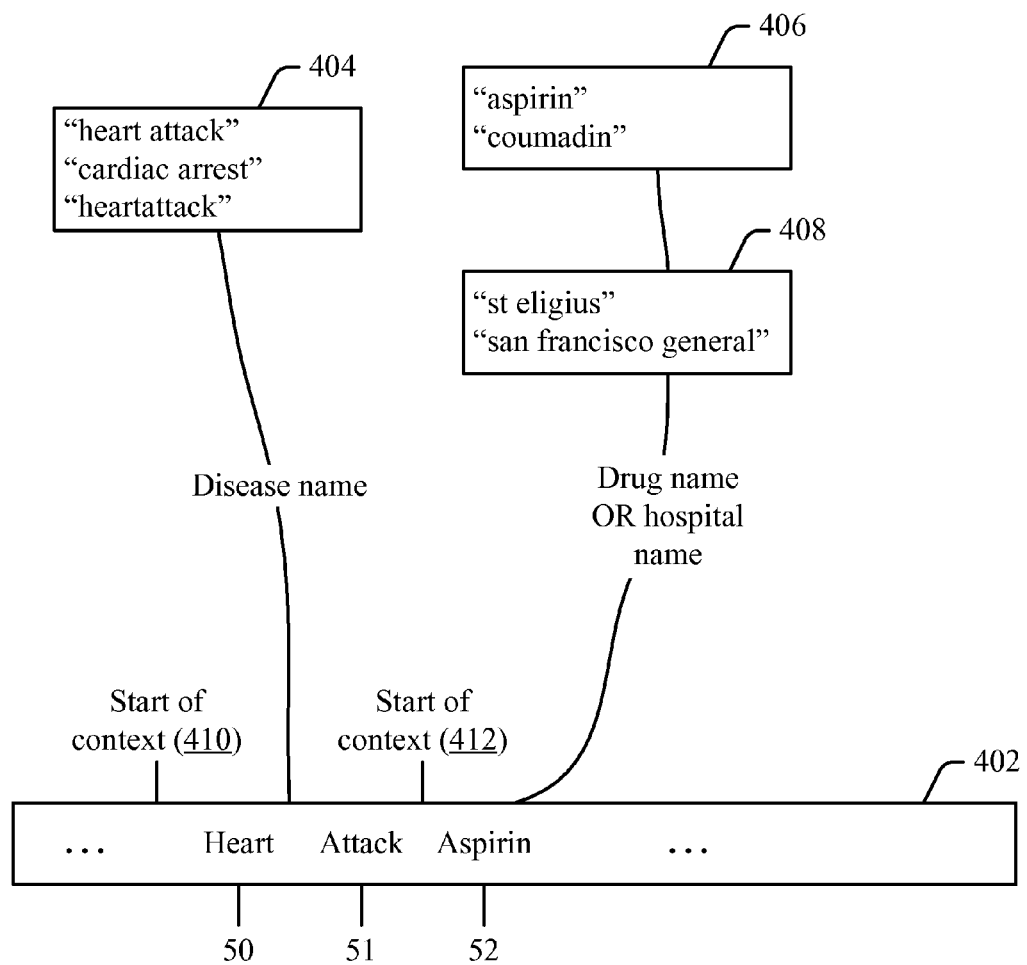
FIG. 4 is a block diagram of an example input stream that may be matched against a container.

FIG. 4 shows an example of how an input stream may be matched against a container. In one example, the basic unit of input is a word, and words may be viewed as having ordinal positions in the input stream. Thus, in example input stream 402, the word "heart" has position 50, the word "attack" has position 51, and the word "aspirin" has position 52. In the example of FIG. 4, the input stream is to be matched against an "and" container, which matches a sequence of words that has a disease name followed by either a drug name or a hospital name. The "and" container might be specified as the conjunction of (a) phrase set 404, which lists disease names, and (b) an "or" container that combines phrase set (406) (listing drug names), and phrase set 408 (listing hospital names).

As words in input stream 402 are matched against containers, they are "consumed" in the sense that the current context moves forward after a match has been found between the container and some sequence of words in the input. Thus, when the processing of input stream 402 starts, the current context begins with the first word in the input stream. After some amount of analysis, words have been consumed by matching words toward the beginning of input stream 402 against containers, and the context moves ahead to the point marked "start of context" 410, at which point the next word to be evaluated is at position 50. In general, after words in input stream 402 are matched against phrases in a container, those words are not re-used and the current context moves ahead (although, as noted above, "repeat" container may be used, which allows words in an input stream to be reused in a certain way).

When words are "consumed," the current context is moved ahead so that the consumed words appear in input stream 402 behind the current context. So, at some point during processing of input stream 402, the current context is at "start of context" 410. The phrase analyzer then attempts to match words, beginning at that point, against the phrases in the container described above. The phrase analyzer attempt to find an instance of the disease name phrases in input stream 402, and determines that the next two words in the stream (at positions 50 and 51) are "heart" and "attack". Since that sequence appears in the list of disease names (phrase set 404), the phrase analyzer consumes the words at positions 50 and 51. The phrase analyzer then attempts to determine whether the "or" container that contains phrase sets 406 and 408 can be matched in the context that begins after the words "heart" and "attack" have been consumed. The start of that second context is marked by reference numeral 412, and the next position in the input stream is position 52. The word at position 52 is "aspirin", which matches one of the phrases in phrase set 406. Since phrase sets 406 and 408 are in an "or" container, that container is matched if the current context (i.e., the context beginning at reference numeral 412) has a phrase from either of those phrase sets. Therefore, the phrase analyzer may conclude that the "or" container is matched due to the appearance of the word "aspirin" starting at the current context. So, the word "aspirin" is consumed, the current context moves to the next position in input stream 402, and matching of the input stream against containers continues.

Figure 5:
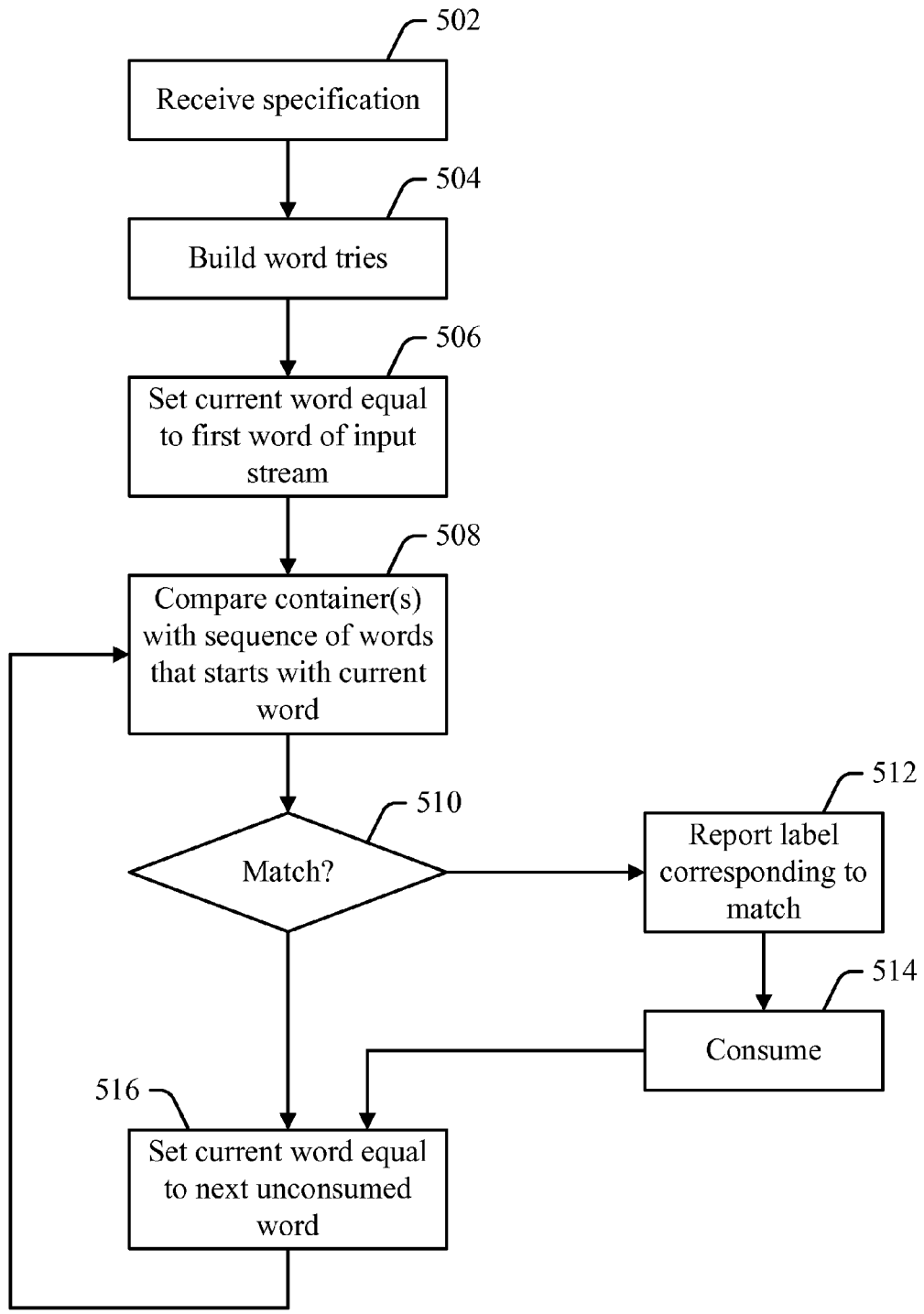
FIG. 5 is a flow diagram of an example process in which an input stream may be analyzed.

FIG. 5 shows an example process in which an input stream may be analyzed. Before turning to a description of FIG. 5, it is noted that the flow diagram of FIG. 5 is described, by way of example, with reference to the phrase analyzer that is shown in FIG. 1 and described above, although the stages of FIG. 5 may be carried out in any system using any components, and are not limited to the example of FIG. 1. Additionally, it is noted that the flow diagram in FIG. 5 shows an example in which stages of a process are carried out in a particular order, as indicated by the lines connecting the blocks, but the various stages shown in this diagram may be performed in any order, or in any combination or sub-combination.

At 502, a specification may be received. For example, specification 104 (shown in FIG. 1), which comprises data expression(s) and code expression(s) may be received at 502.

At 504, word tries may be built based on the expressions that were received in the specification. For example, if a specification has a code expression indicating that a drug name is to be matched in the input stream, and if the specification includes a definition of a "drug name" phrase set that lists fifty different drug names, then a word trie may be built to detect the occurrence of any of those drug names in the input streams. Word tries are one type of structure that may be used to match sequences of words, although any other type of structure could be used.

At 506, the process sets the current word (i.e., the word that the process is currently considering) to be the first word in the input stream.

At 508, the phrase analyzer may compare the containers defined in its code expressions with the current context of the input stream. This comparison may be performed, for example, using the word tries that were built at 504. The context may be cloned whenever branching occurs. That is, when there is more than one possible way to consume the input stream, the current context may be cloned so that the analyzer can try different patterns on the current context. (However, the cloning may be implemented without making a new physical copy of the entire context.) A branch can therefore advance, consuming words from the context in an exploratory way. The branching may occur recursively—i.e., the analyzer could induce multiple sub-branches, each of which runs with its own cloned context. Whenever a branch stops without matching, the operation may be rolled back up to previous the branch point and the previous context may be restored. Then the next branch may then be taken.

At 510, it is determined whether there is a match between the current context in the input stream, and a container defined in the specification. If there is a match, then the label corresponding to the match is reported at 512. For example, if one of the containers is associated with the label "drug names" and a drug name match is found, then the existence of, and position of, the drug name in the input stream may be reported. (Text file 116, shown in FIG. 1, is an example format that may be used to report the existence and/or position of a match in an input stream.)

It is noted that the reporting of a match may include both the position in the input stream at which the match was found, and a label that applies to the match. The label may be specified as part of the container that defines the structure to be matched. For example, the tag that introduces the container may contain a name and/or a type. Thus,

```
<and name= "Drug&Disease">
    <phraseSet>DrugName</phraseSet>
    <phraseSet>DiseaseName</phraseSet>
</and>
``` defines an "and" container such that, if the input stream contains a drug and disease name at, e.g., words 5-10, then the output might read "Drug&Disease 5-10". Similarly, a container can be associated with a type. Thus, if a container is defined as:

```
<and type= "DrugMatch" name= "Drug&Disease">
    <phraseSet>DrugName</phraseSet>
    <phraseSet>DiseaseName</phraseSet>
</and>
``` then (assuming again that words 5-10 contain a drug name and a disease name), the output might read "DrugMatch/ Drug&Disease 5-10".

At 514, the words that were used in the match may be consumed. As described above, words in an input stream that have been matched to containers are normally consumed, so that the matching process may proceed to the next portion of the input stream (although in some cases, such as the "repeat" container or the "list" container, several matches may be attempted on the same portion of the input stream).

If no match is found at 510, then the process continues from 510 to 516. If a match was found, then the process continues from 514 to 516. Either way, when 516 is reached, the current word (i.e., the word that is being examined by a phrase analyzer) is set equal to the next unconsumed word. The process then returns to 508, to attempt to match the context beginning at the current word against the container(s) defined in the specification that was received at 502.

The process shown in FIG. 5 may continue until all of the words in an input stream have been consumed.

The output of the process shown in FIG. 5 may be used in any type of application that uses analysis of text. For example, the output of the process of FIG. 5 may be used by a feature extraction application that attempts to label entities based on the information contained in a text document (e.g., an application that attempts to assign labels such as "Joe is a doctor" or "Alice is a lawyer" by analyzing a text document in which Joe and Alice are mentioned). Or, the output may be used to normalize a query that is to be used in a search, or to index documents that are to be used in a search. These are some example uses of the output of the process shown in FIG. 5, although text analysis may be performed for any reason, and thus the output of a text analysis process may be used in any manner. In general, any tangible action may be taken based on the text analysis performed by the process of FIG. 5, and that process may include the performance of such a tangible action.

Figure 6:
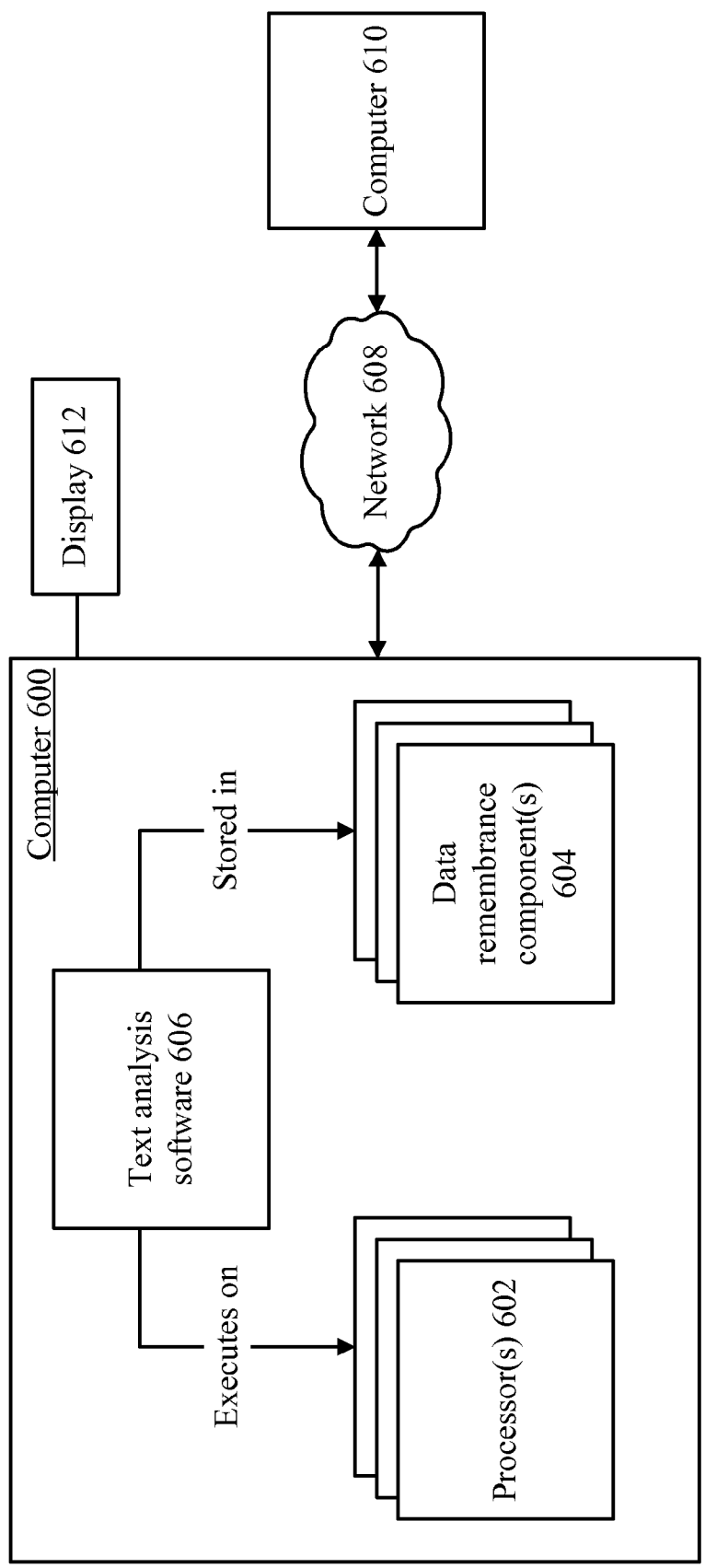
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is text analysis software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., a personal computer, a server computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions that, when executed by a computer, cause the computer to perform acts comprising:
   receiving a specification of a text pattern to be matched in an input stream, said specification comprising one or more data expressions and one or more code expressions, the data expressions defining one or more phrase sets, a first one of the code expressions comprising a first container that comprises a first phrase set, a second phrase set, and a second container that comprises a third phrase set and a fourth phrase set, said specification further comprising a map set and an equivalence set that maps a plurality of phrases to a first phrase based on misspellings and equivalent phrases, said first container comprising a switch that branches between a plurality of match labels;
   comparing words in said input stream with said first container, said comparing act converting, based on said map set, any of said plurality of phrases to said first phrase when any of said plurality of phrases is encountered in said input stream;
   determining that a context in said input stream matches said first container based on a finding that said context matches either said first phrase set or said second phrase set, said context being labeled as a first label if said context matches said first phrase set, or being labeled as a second label if said context matches said second phrase set; and
   generating a report indicating that said container matches a sequence of words in said input stream.
   wherein a container represents the various ways in which possible phrase sets may be combined as part of a text pattern to be matched such that the context moves forward after a match has been found between the container and a sequence of words in the input stream and a next container is processed after a location of the matching sequence of words.

2. The one or more computer-readable storage devices of claim 1, wherein said generating of said report comprises:
   creating a file that identifies one or more ordinal positions in said input stream in which a match for said container is found, and a label that identifies said match.

3. The one or more computer-readable storage devices of claim 1, wherein second container comprises either:
   an AND container that specifies that said context matches said second container when said context comprises an instance of said third phrase set and an instance of said fourth phrase set; or
   an OR container that specifies that said context matches said second container when said context comprises an instance of said third phrase set or an instance of said fourth phrase set.

4. The one or more computer-readable storage devices of claim 1, wherein said second container comprises an ALL container that specifies that said context matches said second container when (a) said context comprises an instance of said third phrase set and an instance of said fourth phrase set, and (b) there are no more words to be consumed in said context after words corresponding to all elements in said second container have been consumed.

5. The one or more computer-readable storage devices of claim 1, wherein said second container comprises a REPEAT container, wherein said context starts at a first ordinal position in said input stream, and wherein said acts further comprise:
   determining whether said input stream contains instances of elements in said second container starting at said first ordinal position; and
   determining whether said input stream contains instances of elements in said second container starting at successive ordinal positions following said first ordinal position.

6. The one or more computer-readable storage devices of claim 1, wherein said determining of whether said context matches said container comprises determining whether said context comprises an instance of said first phrase set, an instance of said second phrase set, and an instance of said second container.

7. The one or more computer-readable storage devices of claim 1, wherein said second container comprises a LIST container, and wherein said determining comprises:
   determining that said context comprises an instance of said third phrase set; and
   after determining that said context comprises an instance of said third phrase set, determining whether said context comprises instances of all other elements in said second container, said context matching said first container as long as said context comprises an instance of said first phrase set, said second phrase set, and at least one of the elements in said second container.

8. A system comprising:
   one or more processors;
   one or more data remembrance components;
   a specification that is stored in said one or more data remembrance components, said specification comprising:
      a data expression that defines a plurality of phrase sets;
      a code expression that defines a first container that specifies a combination that comprises a first one of said phrase sets, a second one of said phrase sets, and a second container that comprises a third one of said phrase sets and a fourth one of said phrase sets; and a map set and an equivalence set that maps a plurality of phrases to a first phrase based on misspellings and equivalent phrases, said phrase analyzer encountering one of said plurality of phrases in said input stream and, based on said map set, converting said one of said plurality of phrases to said first phrase when determining whether said input stream matches said first container; and a phrase analyzer that executes on said one or more processors, that receives said specification and an input stream, that compares words in said input stream to said first container, and that generates a report that identifies where, in said input stream, a match between said first container and said input stream is found, said first container comprising a switch that branches between a plurality of match labels, said phrase analyzer labeling a portion of said input stream that matches said first container as a first label if said portion matches said first phrase set, or being labeled as a second match if said context matches said second phrase set, wherein a container represents the various ways in which possible phrase sets may be combined as part of a text pattern to be matched such that the context moves forward after a match has been found between the container and a sequence of words in the input stream and a next container is processed after a location of the matching sequence of words.

9. The system of claim 8, wherein said specification further comprises:

an equivalence set that comprises a plurality of phrases, said phrase analyzer finding that all of said plurality of phrases in said equivalence set are found when any one of said phrases is found in said input stream.

10. The system of claim 8, wherein second container comprises either:

an AND container that specifies that said input stream matches said second container when a context in said input stream comprises an instance of said third one of said phrase sets and an instance of said fourth one of said phrase sets; or an OR container that specifies that said input stream matches said second container when a context in said input stream comprises an instance of said third one of said phrase sets or an instance of said fourth one of said phrase sets.

11. The system of claim 8, wherein said second container comprises an ALL container that specifies that said input stream matches said second container when (a) a context in said input stream comprises an instance of said third one of said phrase sets and an instance of said fourth one of said phrase sets, and (b) there are no more words to be consumed in said context after words corresponding to all elements in said ALL container have been consumed.

12. The system of claim 8, wherein said second container comprises a REPEAT container, and wherein said phrase analyzer determines that a sequence of a plurality of words starting at a first ordinal position in said input stream matches said second container, and subsequently compares said second container to a sequence of words that starts one ordinal position ahead of said first ordinal position, and after a word that appears one ordinal position ahead of said first ordinal position has already been consumed.

13. The system of claim 8, and wherein said phrase analyzer determines whether said input stream matches said first container by determining whether a context in said input stream comprises an instance of said first one of said phrase sets, an instance of said second one of said phrase sets, and an instance of said second container.

14. The system of claim 8, wherein said second container comprises a LIST container, wherein said phrase determines that input stream comprises a context that comprises an instance of said third one of said phrase sets and subsequently determines whether said context comprises instances of all other elements in said second container, said context matching said first container as long as said context comprises said first phrase set, said second phrase set, and an instance of at least one of the elements in said second container.

15. A method of performing an action based on input text, the method comprising:

using a processor to perform acts comprising:

receiving a map set and an equivalence set that maps a first plurality of phrases to a first phrase based on misspellings and equivalent phrases;

converting occurrence of any one of said first plurality of phrases in an input text to said first phrase;

comparing words in said input text to a first container that describes a combination that comprises a first phrase set, a second phrase set, and a second container, said first phrase set comprising a first plurality of phrases, said second phrase set comprising a second plurality of phrases, said second container comprising a third phrase set and a fourth phrase set;

determining that a sequence of words in said input text matches said first container, said match being found based on a match between said sequence of words and said first phrase, said first phrase occurring in said text due to having been converted from one of said first plurality of phrases by said converting act, said first container comprising a switch that branches between a plurality of match labels, said sequence of words being labeled as a first label if said context matches said first phrase set, or being labeled as a second label if said context matches said second phrase set;

generating a report that indicates where, in said input text, said sequence of words occurs; and taking a tangible action based on said report, wherein a container represents the various ways in which possible phrase sets may be combined as part of a text pattern to be matched such that the context moves forward after a match has been found between the container and a sequence of words in the input stream and a next container is processed after a location of the matching sequence of words.

16. The method of claim 15, further comprising:

using a processor to perform acts comprising:

creating a text file that identifies one or more ordinal positions in said input text in which a match for said container is found, and a label that identifies said match.

17. The method of claim 15, wherein said second container comprises either:

an AND container that specifies that a context in said input text matches said second container when said context comprises an instance of said third phrase set and an instance of said fourth phrase set; or an OR container that specifies that a context in said input set matches said second container when said context comprises an instance of said third phrase set or an instance of said fourth phrase set.

18. The method of claim 15, further comprising:
using a processor to perform acts comprising:
receiving a specification that comprises:
data expressions that comprise said first phrase set and said second phrase set; and
code expressions that comprise said first container.

19. The method of claim 18, wherein said specification further comprises:
said map set; and
an equivalence set that comprises a second plurality of phrases;
and wherein the method further comprises:
using a processor to perform acts comprising:
indicating that all of said second plurality of phrases have occurred in said input text when any one of said second plurality of phrases occurs in said input text.

20. The one or more computer-readable storage devices of claim 1, said specification further comprising an equivalence set that comprises a plurality of phrases, said determining act finding that all of said plurality of phrases in said equivalence set are found in said context when any one of said phrases is found in said context.

\* \* \* \* \*